United States Patent
Mahmoodi

[15] 3,663,917
[45] May 16, 1972

[54] DISPOSABLE TEMPERATURE-SENSING DEVICE

[72] Inventor: Parviz Mahmoodi, White Bear, Minn.
[73] Assignee: Minnesota Mining and Manufacturing Company, St. Paul, Minn.
[22] Filed: Jan. 7, 1970
[21] Appl. No.: 1,248

[52] U.S. Cl..............................338/28, 73/362 AR, 206/16.5
[51] Int. Cl. .............................................................G01k 7/22
[58] Field of Search..............................338/28, 30; 206/16.5; 73/362 AR

[56] References Cited

UNITED STATES PATENTS 3,254,533   6/1966   Tongret ..............................73/343 X
3,241,370   3/1966   Mertler et. al......................73/362 AR Primary Examiner—Samuel Feinberg
Assistant Examiner—R. Kinberg
Attorney—Kinney, Alexander, Sell, Steldt & Delahunt

[57] ABSTRACT

A temperature-sensing device comprising generally an elongated temperature-sensing probe having a thermistor on one end, means on the opposite end of the probe for connecting it with the temperature metering device, an impervious disposable sheath comprising a low thermal-conducting, elongated sleeve having a high thermal-conducting metal tip sealing one end thereof adapted to intimately receive the thermistor-containing probe, and means for removably holding said sheath on said probe. When the device is to be used, the sheath is placed over the probe and held thereon, the thermistor-containing end of said probe being urged into intimate contact with the metal tip, allowing rapid thermal transfer between the temperature source and the thermistor so that temperature may be read in degrees on the metering device. The disposable sheath prevents cross-contamination among patients in clinical use.

4 Claims, 6 Drawing Figures

Patented May 16, 1972
3,663,917
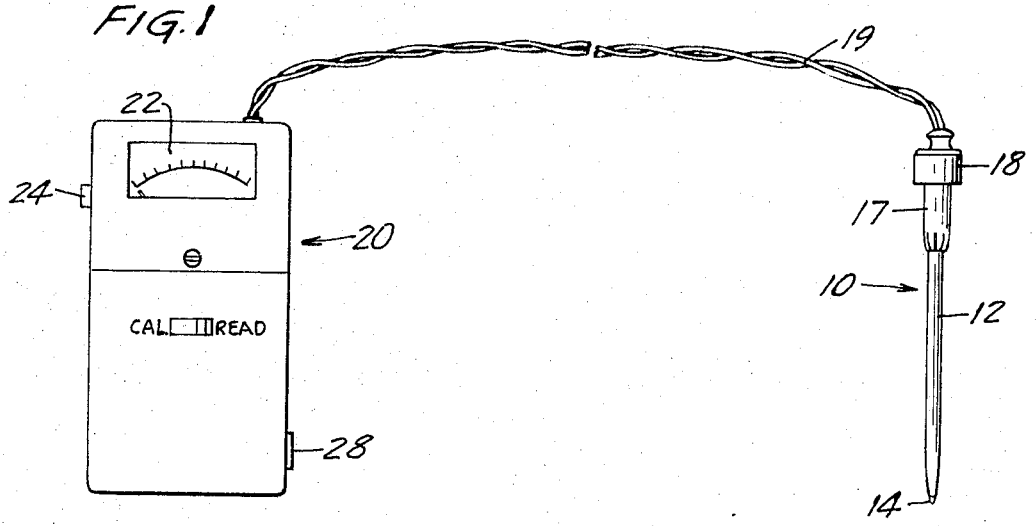
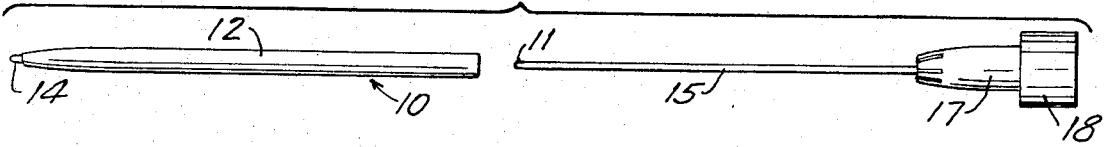
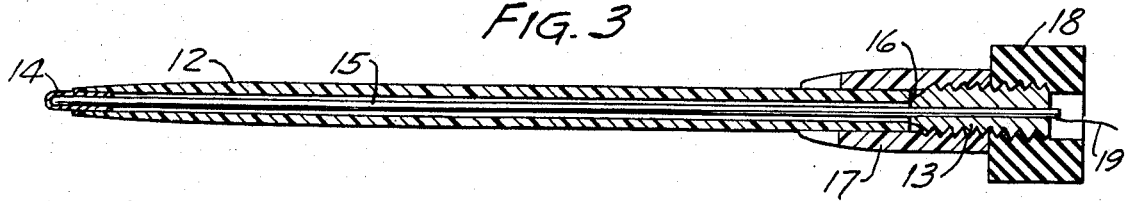
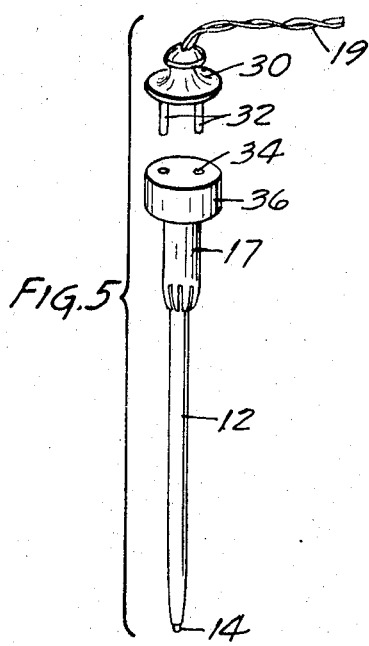
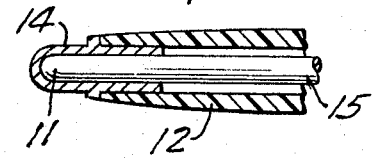
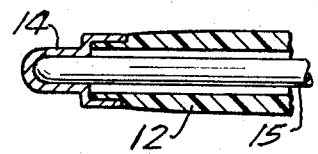
INVENTOR.
PARVIZ MAHMOODI
BY Kinney, Alexander
Sell, Steldt & DeLaHunt
ATTORNEYS

DISPOSABLE TEMPERATURE-SENSING DEVICE

BACKGROUND OF THE INVENTION

The present invention relates to disposable thermometer sheaths which may be used as sterile covers for a temperature-sensitive probe used with temperature-indicating devices to measure the body temperature. More particularly, the present invention relates to a disposable sheath for a temperature-sensitive probe which allows extremely fast thermal transfer of the temperature from the body to the temperature-sensing device.

At present, body temperature is customarily measured by inserting a slow response temperature-sensing probe into a body opening of a subject. Generally, the probe employed is a temperature-indicating device, such as a glass mercury bulb-type thermometer. The problem arises when the same probe is used to take the body temperature of a number of individuals, as it is necessary to completely and thoroughly sterilize the probe after each use which is time consuming, expensive, not always effective and is especially bothersome in doctor's offices or hospitals where a great many temperatures are taken. If sterilization is not properly done, cross-contamination between and among patients will most probably result. Further, conventional mercury-in-glass type thermometers are difficult to read precisely and may become a hazard if broken off while inserted in a subject, especially with an infant.

In attempts to obviate the above-described problems, and to also decrease the time involved in obtaining a temperature reading from a particular patient, electrically responsive temperature-sensing devices have been prepared. See, for example, U.S. Pat. Nos. 3,402,378 and 3,082,625. Although these thermometer systems are more accurate and easier to read, they do not solve the problem of cross-contamination. Attempts have been made to solve that problem by using a disposable sheath over the temperature-sensing probe which may be discarded after use. Such a disposable sheath is described in U.S. Pat. No. 3,349,896, wherein a disposable sheath for use on a temperature-sensing probe comprises a nonstretchable tube and a heat-conductive rubbery diaphragm sealing one end of the tube. Although this procedure provides a disposable sheath that may be discarded after every use, it does not allow fast sensing and recordation of temperature because thermotransfer through the rubber tip is slow.

SUMMARY OF THE INVENTION

According to the present invention, an inexpensive, disposable sterile sheath is provided for a temperature-sensing probe which may be conveniently discarded after use. More particularly, the present invention provides a rigid disposable sheath for a temperature-sensitive probe which allows an extremely fast transfer of heat from the area in which the temperature is being measured to the metering device, thus allowing more accurate reading of temperature than has been heretofore realized.

The temperature-sensing device of the present invention comprises generally, in combination, an elongated temperature-sensing probe having a thermistor on one end, means on the opposite end of said probe for connecting it with a temperature-metering device, a disposable sheath comprising a low thermal-conducting elongated sleeve haVing a high thermal-conducting metal tip sealing one end thereof and adapted to intimately receive said probe, and means for removably holding said sheath on said probe, whereby, when said sheath is inserted on said probe and is held thereon, said thermistor-containing end of said probe is urged into intimate surface contact with said metal tip allowing thermal transfer therebetween.

The invention will be better understood with reference to the drawing wherein;

FIG. 1 is a perspective view showing the disposable sleeve in combination with means connecting the temperature-sensing probe with the metering device, FIG. 2 shows a telescopic view of the sleeve removed from the probe, FIG. 3 is a cross section showing the temperature-sensitive probe and the disposable sheath, FIG. 4 is an enlargement of the tip section of FIG. 3, FIG. 5 is an enlargement of the tip section showing a different form of attachment between the metal tip and the sleeve, and FIG. 6 is a perspective view showing a female and male attachment of the metering device to the temperature-sensitive probe.

With reference to the drawings, particularly FIGS. 1, 2, and 3, the temperature-sensing device of the present invention comprises a disposable thermometer sheath 10 for a temperature-sensing probe in combination with a temperature-recording device 20 as illustrated in FIG. 1. The temperature-sensitive portion of the device comprises an elongated temperature-sensing probe 15 having a thermistor (not shown), a temperature-sensing element, on end 11. The probe 15 is attached to a base 18 and is connected to a temperature-measuring device 20 by wire 19, the wire being connected through the probe to the thermistor on end 11 of the probe.

A disposable sheath 10 is adapted to be placed over the probe 15 so that the tip 14 of the sheath will receive the end 11 of the probe in intimate contact. The sheath, as illustrated, is frictionally held in place by a radial loaded spring 17, preferably plastic, which is attached to base 18 which, after use, may easily be removed from the probe. The sheath may be held by any suitable means, however, such as with a clamp. In the preferred embodiment, a cylindrical core 13, which rigidly holds the probe 15, is partially screwed into base 18 and the radial spring 17 is screwed onto the remaining portion of the core 13 and around the probe, as shown in FIG. 3, thus holding the spring and base together. The sleeve 12 is designed so that when it comes to rest on the core 18 at 16, the tip 11 of probe 15 is in intimate contact with the entire inner surface of metal tip 14 attached to the end of the sleeve, the core 18 also preventing the user from inserting the probe into the tip further than is necessary which might dislodge the tip and destroy the usefulness of the disposable sheath.

It is important that the tip 11 of the probe, containing the thermistor and the metal tip 14 have intimate contacting surfaces to insure rapid sensing of temperature and is better illustrated in FIG. 4. It has been determined that if the outer surface area of the metal tip 14 (which must be thermally conductive) which is placed in the area in which temperature is to be measured is relatively large with relation to the remainder of the sheath, there is greater surface contact of the tip with the area in which measurement is taken and thus there is more heat transfer through the metal tip to the thermistor in the probe which shortens the time necessary for a reading, and more importantly, increases the accuracy of the reading. It is also important, for the reasons heretofore stated, that the inner walls of the tip 14 be in intimate contact with the probe 15 over as large a surface area as is practical. Again, where there is a greater contacting surface area between the probe and the tip, there is more surface available for thermal transfer resulting in a faster and more accurate reading. Preferably, there is about a one-sixteenth to one-fourth inch contacting surface between the metal tip and the probe along the length thereof.

A modification of the tip attachment to the sleeve is illustrated in FIG. 6 where the metal tip 14 is attached outwardly on the sleeve 12. Many such modifications are possible but it is preferred to have as much contacting surface area between tip 14 and probe 15 as possible.

Preferably, the probe has an outer diameter of about 36 mils where the device is to be used for taking human temperatures orally. The probe is generally hollow, insulated, and has the thermistor mounted in the tip 11 thereof. Contacting wires 19 run from the thermistor, through the probe, and emerge at the base 18 where they are connected to the measurement device 20. The probe is preferably constructed of stainless steel although other metals or rigid materials, such as plastic, may be used.

The sleeve 12 is preferably constructed from plastic as it is lightweight, of low conductivity to limit heat flow away from the tip, impervious, sterilizable, durable and inexpensive so that it may be conveniently discarded after use. Materials having similar properties, such as metals, may be used. Whatever material is used to fabricate the sheath, it should be sufficiently rigid to allow placing of the sheath over the probe and to its desired position. When used with a probe having dimensions heretofore described and for taking temperatures orally, the sheath is preferably about 3–4 inches long and has a diameter of about one-eighth to three-eighth inch. The size of the sheath will, of course, depend on the size of the probe used and the site where the temperature is to be taken.

The metal tip of the sheath must be heat conductive and is preferably made of copper, aluminum, brass, silver, stainless steel or other similar heat conductive metals. The metal tip is of a tubular construction having an open end to receive the probe and is mounted onto one end of said sleeve, sealing the end thereof. Preferably, the tip is mounted on the sleeve during manufacture by heat bonding the plastic sleeve to the tip. Other means may be employed to mount the tip on the sleeve, however, such as with an adhesive. In the preferred embodiment, where the probe has a diameter of about 36 mils, the inner diameter of the metal tip 14 should be about 2 mils larger or about 38 mils to insure a smooth insertion of the probe but yet providing a tight, snug fit to insure contact with the tip and probe surfaces for rapid heat transfer. Regardless of the diameter of the probe, the inner diameter of the tip should be about 2 mils larger than that of the probe. The thickness of the walls of the metal tip is preferably in the range of from about 0.002 to 0.015 inch, such thinness insuring optimum heat transfer, mechanical strength and impermeability, so that moisture will not influence the temperature sensing of the thermistor. The walls of the tip may, however, be as thin as 0.001 inch or foil-like providing a more ductile or pliable tip. Such ductility and pliability may be advantageous in that a metal tip having an inner diameter just slightly smaller than the outer diameter of the probe may be used so that when the probe is inserted into the tip, the metal will be forced to expand slightly over the probe providing a very tight conforming contact between the probe and tip surfaces. Because the sheath is designed to come to rest on the core 13 when the end of the probe is in optimum surface contact with the metal tip 14, the probe may not be inadvertently pushed too far into the metal tip causing a rupture thereof. Further, such thinness of the metal tip would allow an extremely fast transfer of heat from an area where temperature is to be taken to the temperature-sensing probe. The metal tip should be from about one-sixteenth to one-fourth inch long to provide the optimum contacting surface of the probe and tip as heretofore described.

When the temperature-sensing device of the present invention is to be used, for example, in taking oral temperatures, a clean, sterile sheath 10 is placed over the probe 15 until the tip 11 of the probe is inserted into the metal tip 14 of the sheath as far as it will go to insure intimate surface contact between the probe and the heat conductive tip. The disposable sheath, along with the probe, is then placed in the patient's mouth in the ordinary manner. In less than 1 minute, approximately 15 to 30 seconds, the patient's temperature may be read in degrees on the readout device 20. The disposable sheath may then be conveniently removed from the probe and discarded.

The temperature-sensing system of the invention is based on the change of electrical current in the system which change is measured in terms of calibrated degrees. The electrical circuit is set up between the readout device, which may be battery charged, and the thermistor. When the temperature increases and heat is transferred to the thermistor in the probe, there is a change in resistance in the circuit. The change in resistance is a function of the change in temperature, which change is recorded on dial 22 in degrees. The initiation of the current is through a small button 24 on the device. The device may be calibrated by moving the switch 26 to "cal" and the temperature may be read when the switch is moved to "Read".

In a further embodiment, the thermo-sensing portion of the device (probe and sheath) may be attached to the readout device by means of a male-female plug as illustrated in FIG. 5. The wire 19, attached to the readout device 20 on one end, is attached on the other end to a plug 30 having prongs 32 extending therefrom. The prongs are inserted into holes 34 in the probe base 36 forming a connection between the probe and the readout device. In this manner, the disposable sheath may be placed in the patient's mouth without being attached to the readout device, freeing the nurse to do other work and also making it less cumbersome for the patient, allowing him to move without restriction by the attached wire. After one minute or less, the connection is made by means of the male-female plug, and the temperature may be instantly read after which the sheath may be discarded. Various other methods of attaching the readout device to the probe would be obvious to one skilled in the art.

The temperature-sensing device of the present invention can also be adapted to record the temperature of a patient on paper or on a screen. This may be done by using a portable temperature indicator or through transferance of the information through amplification medium onto a recorder or a large indicator such as a screen. This procedure would be especially valuable for operating room monitoring. Connections may be made through an outlet 28 suitably located on the readout device.

What is claimed is:

1. A temperature-sensing device for the measurement of temperature and haVing an extremely fast response, comprising in combination:
   an elongated temperature-sensing probe having a termistor on one end;
   means on the opposite end of said probe for connecting it with a temperature metering device;
   a rigid, disposable, impervious sheath comprising a low thermal-conducting elongated sleeve having a high thermal conducting metal tip sealing one end thereof and adapted to intimately receive said probe, wherein there is about a one-sixteenth to one-fourth inch contacting surface between said metal tip and said probe along the length thereof; and
   means for removably holding said sheath on said probe;
   whereby when said sheath is inserted on said probe and held thereon, the thermistor-carrying end of said probe is urged into intimate contact with said metal tip allowing thermal transfer therebetween.

2. The temperature-sensing device of claim 1 wherein said sleeve is rigid plastic and said metal tip is copper.

3. The temperature-sensing device of claim 1 wherein said metal tip has a wall thickness of from about 0.002 to 0.015 inch.

4. A disposable sheath for use on a temperature-sensing probe, said probe having a thermistor on one end, comprising a low thermal conducting, elongated, rigid sleeve and a high thermal conducting metal tip sealing one end of said sleeve and adapted to intimately receive the thermistor containing end of said probe, such that there is about a one-sixteenth to one-fourth inch contacting surface between said metal tip and said probe along the length thereof said metal tip has a wall thickness of from about 0.002 to 0.015 inch.

* * * * *